(No Model.)

M. W. DEWEY.
METHOD OF ELECTRICALLY HEATING BARS, &c., FOR WELDING AND WORKING PURPOSES.

No. 422,190. Patented Feb. 25, 1890.

WITNESSES:
J. J. Laass
C. L. Bendixon

INVENTOR
Mark W. Dewey
BY
Duell, Laass & Duell
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRICALLY HEATING BARS, &c., FOR WELDING AND WORKING PURPOSES.

SPECIFICATION forming part of Letters Patent No. 422,190, dated February 25, 1890.

Application filed December 11, 1889. Serial No. 333,319. (No model.)

*To all whom it may concern:*

Be it known that I, MARK W. DEWEY, of Syracuse, in the county of Onondaga, in the State of New York, have invented new and useful Improvements in the Method of Electrically Heating Bars, &c., for Welding and Working Purposes, of which the following, taken in connection with the accompanying drawings, is a full, clear, and exact description.

My invention relates to the application of heat to bars or blanks of metal or other material to be welded, worked, or treated; and it consists, essentially, in exposing or subjecting the work or the part of the same to be heated and operated upon to the influence or action of a magnetic field of rapidly-changing strength or polarity and suitable density until said work is sufficiently heated or softened and then performing the desired operation upon the same, which may be welding, bending, or treating the work in any manner.

My invention consists, further, in suitably enveloping the part of the blank to be heated and operated upon to prevent radiation of heat therefrom, and certain other features, hereinafter referred to.

This invention is designed to be utilized for effecting all manner of welding, soldering, brazing, working, and treating operations of metals and other materials.

Some of the advantages derived from my method are: Bars or blanks of different sizes and conductivities can be heated without varying the volume of the current, the electric current to be employed may be genererated by any suitable and convenient means, and transformation of the current is unnecessary in many cases or at least to the great extent usually required.

Figure 1:
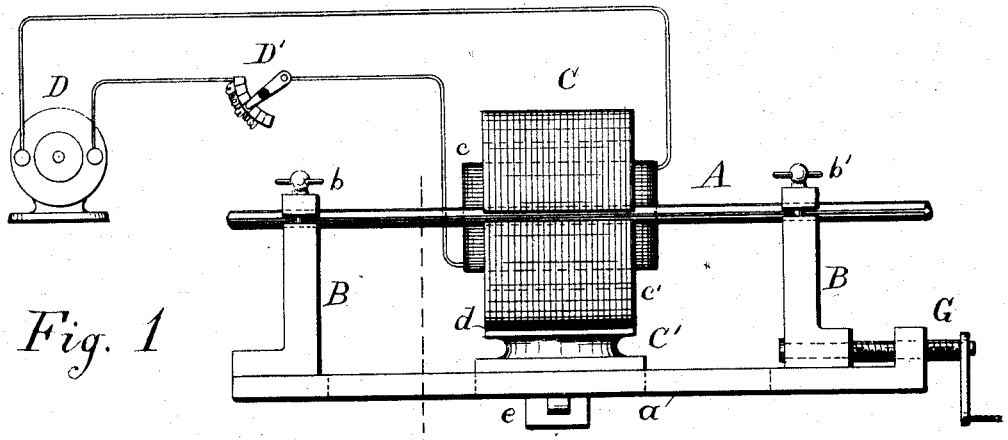
Figure 2:
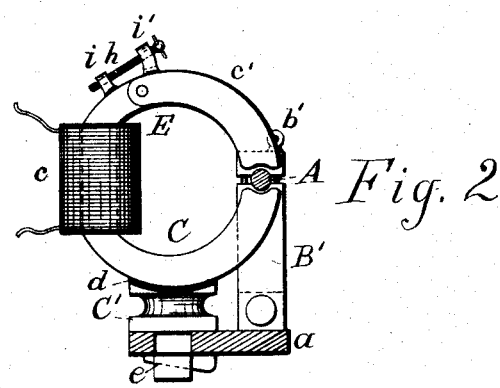
Figures 3, 4:
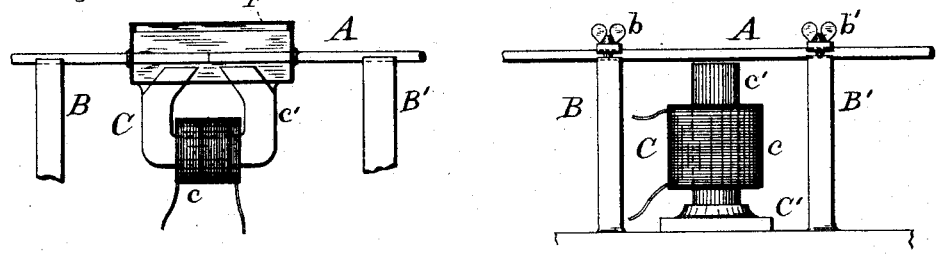
Figure 5:
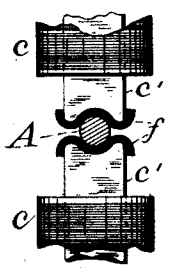

In the accompanying drawings, Figures 1 and 2 are respectively side and sectional elevations of an apparatus adapted for accomplishing my method of working metals, &c. Fig. 3 is another form of apparatus having an inclosure to prevent radiation. Fig. 4 shows a simple form of apparatus in which but one pole of the magnet is in proximity to the bar, and Fig. 5 shows insulating material interposed between the poles and the bar to be heated.

Referring specifically to the drawings, A in the figures represents the bar or bars to be heated and worked or welded, supported upon two supports B and B' and secured thereto by clamps $b$ and $b'$. Support B is stationary, and B' is movable toward and from the other support, so that by moving, by means of screw G, the support B' the bar or bars held by said supports can be subjected either to compression endwise or to tension or drawing out lengthwise, as may be desired.

C is an electro-magnet located between the aforesaid supports at the part or point of the bar or blank A to be heated and operated upon, and is supported by a standard or base C', mounted upon the table $a$ of the apparatus, but is insulated from said base by insulation $d$. The magnet C and its support C' may be moved to any position or location between the supports B and B' to effect the heating of any desired part of the bar between the latter supports, and there fastened by means of the clamp $e$.

The coil $c$ of insulated wire of the electro-magnet C is included in circuit with a suitable source of irregular or alternating electric current D and a suitable current-regulator, (represented in the drawings by an adjustable resistance D'.)

In some cases, or when the source of electricity produces currents of too high tension, the currents should be transformed by suitable means—for instance, as described in my prior patents in metal working, No. 402,416, dated April 30, 1889, and No. 408,875, dated August 13, 1889, for the reason that better results are obtained when the coil is of comparatively low resistance. The core $c'$, located within the coil, is preferably formed of iron wires, rods, or plates, and laminated so that the core will not become greatly heated, but in some cases the core may be solid or in one piece. One of the poles or both are arranged so that the work may be placed and held in contact with or in proximity to said pole or poles. Rapid alternating currents are preferably passed through the coil, which, by means of the iron core, produce a dense but rapidly-changing magnetic field about the poles and work, thereby inducing alternating eddy-currents of great volume in the work, which rapidly raises the temperature of the same to a high degree, or to the required extent necessary for welding or working it.

The core $c'$ (shown in Figs. 1 and 2) is ring-shaped, has its poles somewhat shaped to correspond to the form of the bar, and is in two parts, so that the upper part can be readily applied to the bar to be heated, and removed from said bar, if desired, after the temperature of the bar has been raised to the required extent. The upper part of the core $c'$ is hinged to the lower part above the coil $c$ by the hinge E; and by means of the screw $h$, connecting the lugs $i$ and $i'$ on the parts of the core, the upper part of said core can be easily lifted from the lower part either for the purpose of removing the blank A or of regulating the heat or strength of the magnetic field.

To prevent waste of heat by radiation, the work or both the work and the poles of the core may be enveloped or inclosed by a receptacle or envelope F of suitable material, as shown in Fig. 3. The latter figure shows both poles of the magnet located adjacent to and on one side of the bar to be heated, and inclosed, with the part of the bar A to be heated, in a non-heat-conducting box F.

The simple form of apparatus shown in Fig. 4 is adapted for heating wires or small bars or plates of metal, for soldering and brazing purposes, or metal working not requiring a very great amount of heat.

The insulating material $f$ upon the poles of the magnet in Fig. 5 may be of clay, asbestus, or other suitable material, and serves to hold the bar firmly at a certain distance from the poles, and also partly retains or confines the heat in the bar.

It will be obvious that the apparatus may be greatly modified without departing from the spirit of my invention, as its scope is not confined to the specific forms or arrangements of apparatus shown and described herein.

Having described my invention, what I claim as new, and desire to secure by Letters Patent, is—

1. The herein-described method of electric welding or metal working, consisting in subjecting the work to the influence of a magnetic field, rapidly changing the strength or polarity of the field, thereby raising the temperature of the work to the required extent, and then performing the desired operation upon the same.

2. The herein-described method of electric welding or metal working, consisting in subjecting the work to the influence of a magnetic field, rapidly changing the strength or polarity of the field, partly or wholly surrounding the work with suitable material to prevent radiation of heat, thereby raising the temperature of the work to the required extent, and then performing the desired operation upon the same.

3. The herein-described method of electric welding or metal working, consisting in subjecting or exposing the work at a point to be heated to the influence of a magnetic field, rapidly changing the strength or polarity of the field, thereby raising the temperature of the work to the required extent, and then performing the desired operation upon the same.

4. The herein-described method of electric welding or metal working, consisting in generating an irregular electric current in a conductor including a coil of insulated wire, locating an iron core within the coil, placing the work in proximity to one or both poles of the core, exposing said work to the magnetic action until sufficiently heated, and then performing the desired operation upon the same.

5. The herein-described method of electric welding or metal working, consisting in generating an irregular electric current in a conductor including a coil of insulated wire, locating a laminated iron core within the coil, placing the work in proximity to one or both poles of the core, exposing said work to the magnetic action until sufficiently heated, and then performing the desired operation upon the same.

6. The herein-described method of electric welding or metal working, consisting in generating an alternating electric current in a conductor including a coil of insulated wire, locating a laminated iron core within the coil, placing the work in proximity to one or both poles of the core, exposing said work to the magnetic action until sufficiently heated, and then performing the desired operation upon the same.

7. The herein-described method of electric welding or metal working, consisting in generating an alternating electric current in a conductor including a coil of insulated wire, locating a laminated iron core within the coil, placing the work in proximity to and between both poles of the core, exposing said work to the magnetic action until sufficiently heated, and then performing the desired operation upon the same.

8. The herein-described method of electric welding or metal working, consisting in generating an alternating electric current in a conductor including a coil of insulated wire, locating a laminated iron core within the coil, placing the work in proximity to one or both poles of the core, partly or wholly inclosing the work and the one or both poles in proximity thereto with suitable material to prevent radiation of heat, exposing said work to the magnetic action until sufficiently heated, and then performing the desired operation upon the same.

9. The herein-described method of electric welding or metal working, consisting in subjecting the work to the influence of a magnetic field, rapidly changing the strength or polarity of the field, thereby raising the temperature of the work to the required extent, controlling the temperature by varying the strength of the field, and then performing the desired operation upon the same.

10. The herein-described method of electric welding or metal working, consisting in generating an irregular electric current in a conductor including a coil of insulated wire, locating an iron core within the coil, placing the work in proximity to one or both poles of the core, exposing said work to the magnetic action until sufficiently heated, controlling the heat by varying the distance between the pole or poles and the work, and then performing the desired operation upon the same.

11. The herein-described method of electric welding or metal working, consisting in subjecting the work to the influence of a magnetic field, suitably holding or supporting the work, rapidly changing the strength or polarity of the field, thereby raising the temperature of the work to the required extent, and then performing the desired operation upon the same.

12. The herein-described method of electric welding or metal working, consisting in generating an irregular electric current in a conductor, including a coil of insulated wire, locating an iron core within the coil, placing the work in proximity to one or both of the poles of the core, suitably holding or supporting the work, exposing said work to the magnetic action until sufficiently heated, and then performing the desired operation upon the same.

In testimony whereof I have hereunto signed my name this 9th day of December, 1889.

MARK W. DEWEY. [L. S.]

Witnesses:
C. H. DUELL,
H. M. SEAMANS.